United States Patent
Akirav et al.

(10) Patent No.: US 9,201,605 B2
(45) Date of Patent: *Dec. 1, 2015

(54) SPACE RESERVATION IN A DEDUPLICATION SYSTEM

(71) Applicant: INTERNATIONAL BUSINESS MACHINES CORPORATION, Armonk, NY (US)

(72) Inventors: Shay H. Akirav, Petach-Tikva (IL); Aviv Caro, Modiin (IL); Elena Drobchenko, Raanana (IL); Dov N. Hepner, Hertzelyia (IL); Ofer Leneman, Kfar Saba (IL); Asaf Levy, Rishon Le Zion (IL); Tzafrir Z. Taub, Givaataim (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 94 days.

This patent is subject to a terminal disclaimer.

(21) Appl. No.: 13/710,732

(22) Filed: Dec. 11, 2012

(65) Prior Publication Data

US 2014/0006735 A1    Jan. 2, 2014

Related U.S. Application Data

(63) Continuation of application No. 13/464,525, filed on May 4, 2012, now Pat. No. 8,341,367, which is a continuation of application No. 12/785,277, filed on May 21, 2010, now Pat. No. 7,423,735.

(51) Int. Cl.
*G06F 3/06* (2006.01)
*G06F 11/14* (2006.01)
*G06F 11/20* (2006.01)

(52) U.S. Cl.
CPC .............. *G06F 3/0641* (2013.01); *G06F 3/067* (2013.01); *G06F 3/0619* (2013.01); *G06F 11/1448* (2013.01); *G06F 11/1453* (2013.01); *G06F 11/2053* (2013.01)

(58) Field of Classification Search
CPC .............. G06F 3/0641; G06F 11/1453; G06F 11/2053; G06F 11/1448; G06F 3/0619; G06F 3/067
See application file for complete search history.

(56) References Cited

U.S. PATENT DOCUMENTS

| 6,751,674 B1 | 6/2004 | Satagopan et al. |
| 7,024,529 B2 | 4/2006 | Yamada et al. |

(Continued)

FOREIGN PATENT DOCUMENTS

| CN | 1877727 A | 12/2006 |
| CN | 101604268 A | 12/2009 |

(Continued)

OTHER PUBLICATIONS

International Search Report for Counterpart Application No. PCT/EP2011/056605, mailed Aug. 4, 2011.

*Primary Examiner* — Mardochee Chery
(74) *Attorney, Agent, or Firm* — Griffiths & Seaton PLLC

(57) ABSTRACT

A calculated factoring ratio is determined as a weighted ratio of current nominal data to physical data based on at least one storage capacity threshold and a used storage space currently physically consumed by one of backup and replication data. A maximal nominal estimated space in the computing storage environment is calculated. A remaining space, defined as the maximal nominal estimated space minus a current nominal space in the computing storage environment, is calculated.

18 Claims, 7 Drawing Sheets

(56) References Cited

U.S. PATENT DOCUMENTS

| | | |
|---|---|---|
| 7,506,044 B2 | 3/2009 | Doshi et al. |
| 7,539,710 B1 | 5/2009 | Haustein et al. |
| 7,676,510 B1 | 3/2010 | Karinta |
| 7,720,892 B1 | 5/2010 | Healey, Jr. et al. |
| 7,756,958 B2 | 7/2010 | Nagarajrao et al. |
| 7,818,495 B2 | 10/2010 | Tanaka et al. |
| 7,966,394 B1 | 6/2011 | Talwar et al. |
| 8,019,851 B2 | 9/2011 | Nagarajrao et al. |
| 8,041,794 B2 | 10/2011 | Kohn et al. |
| 2002/0107872 A1 | 8/2002 | Hudis et al. |
| 2002/0144009 A1 | 10/2002 | Cheng et al. |
| 2002/0174198 A1 | 11/2002 | Halter |
| 2003/0135657 A1 | 7/2003 | Barker et al. |
| 2003/0145086 A1 | 7/2003 | O'Reilly |
| 2003/0204557 A1 | 10/2003 | Mandal et al. |
| 2003/0217195 A1 | 11/2003 | Mandal et al. |
| 2004/0025142 A1 | 2/2004 | Mandal et al. |
| 2005/0083854 A1 | 4/2005 | Nagarajrao et al. |
| 2005/0193109 A1 | 9/2005 | Hudis et al. |
| 2007/0226232 A1 | 9/2007 | Yin et al. |
| 2008/0208896 A1 | 8/2008 | Yin et al. |
| 2009/0019082 A1 | 1/2009 | Reeves et al. |
| 2009/0177857 A1 | 7/2009 | Butterworth et al. |
| 2009/0187611 A1 | 7/2009 | Weltman |
| 2009/0249361 A1 | 10/2009 | Amauba et al. |
| 2010/0082783 A1 | 4/2010 | Kohn et al. |
| 2010/0205299 A1 | 8/2010 | Nagarajrao et al. |
| 2011/0185135 A1 | 7/2011 | Fujii et al. |
| 2011/0231605 A1 | 9/2011 | Ogawa et al. |

FOREIGN PATENT DOCUMENTS

| | | |
|---|---|---|
| EP | 1975798 A1 | 10/2008 |
| JP | 2002278704 A | 9/2002 |
| JP | 2008257716 A | 10/2008 |

| Term | Description |
|---|---|
| a. Nominal Data | The data as a backup host wrote it. |
| b. Physical Data | The data after deduplication and compression |
| c. Configured Factoring Ratio | A user definded system attribute for the Expected Nominal to Physical data ratio. |
| d. Current Factoring Ratio | The actual Nominal to Physical data ratio. |
| e. Calculated Factoring Ratio | A Calculation that provides weights for the Expected and the current Nominal to Physical data ratio dynamically based on capacity thresholds and used space. |
| f. Low Capacity Threshold | Below this value the calculated factoring ratio equals the configured factoring ratio. |
| g. High Capacity Threshold | Above this value the calculated factoring ratio equals the current factoring ratio. |
| h. Used space | The actual amount of space currently consumed physically in the storage by either backup or replication data. |
| i. Used space of replicated cartridges | The actual amount of space currently consumed by cartridges originating in replication. |

FIG. 3

SPACE RESERVATION IN A DEDUPLICATION SYSTEM

CROSS-REFERENCE TO RELATED APPLICATIONS

This application is a Continuation of U.S. Pat. No. 8,341,367, filed on May 4, 2012, which is a Continuation of U.S. Pat. No. 8,423,735, filed May 21, 2010.

FIELD OF THE INVENTION

The present invention relates in general to computers, and more particularly to apparatus, method and computer program product embodiments for space reservation in a deduplication system operable in a computing storage environment.

DESCRIPTION OF THE RELATED ART

Deduplication systems may externalize various logical data storage entities, such as files, data objects, backup images, data snapshots or virtual tape cartridges. It is often required that such data storage entities be replicated from their origin site to remote sites. Replicated data entities enhance fault tolerance abilities and availability of data. Such fault tolerance and wide availability is increasingly demanded. While several existing approaches may be used to perform data replication, and specifically, replication of deduplicated data entities, these approaches have accompanying limitations that negatively affect replication efficiency, system performance and data consistency, require additional overhead, or a combination of the above.

SUMMARY OF THE INVENTION

Data deduplication refers to the reduction and/or elimination of redundant data. In a data deduplication process, duplicate copies of data are reduced or eliminated, leaving a minimal amount of redundant copies, or a single copy of the data, respectively. Using deduplication processes provides a variety of benefits, such as reduction of required storage capacity and increased network bandwidth. Due to these and other benefits, deduplication has emerged in recent years as a highly important technological field in computing storage systems. Challenges to providing deduplication functionality include aspects such as efficiently finding duplicated data patterns in typically large storage repositories, and storing the data patterns in a deduplicated storage-efficient form.

Current replication solutions for duplication, in a configuration, for example, where many replication senders are in communication with a receiver also functioning as a backup target, face a challenge of which of backup functionality or incoming replication should receive higher priority. This challenge may currently result in race conditions on the available storage space, as will be further described. In view of the current state of the art, a need exists for a mechanism for replication of deduplicated data that fulfills all requirements for an efficient replication process while avoiding these limitations of existing methodologies in certain configurations such as previously described, thus improving on existing approaches for replication of deduplicated data.

Accordingly, various embodiments for facilitating space reservation functionality in a deduplication system operable in a computing storage environment are provided. In one such embodiment, by way of example only, a calculated factoring ratio is determined as a weighted ratio of current nominal data to physical data based on at least one storage capacity threshold and a used storage space currently physically consumed by one of backup and replication data. A maximal nominal estimated space in the computing storage environment is calculated. A remaining space, defined as the maximal nominal estimated space minus a current nominal space in the computing storage environment, is calculated. If the remaining space is one of equal and less than a user-configured reservation space for backup operations, data replication operations are accepted and stored in the computing storage environment.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 3 illustrates a number of definitions used throughout the following descriptions and claimed subject matter;

DETAILED DESCRIPTION OF THE DRAWINGS

Figure 1:
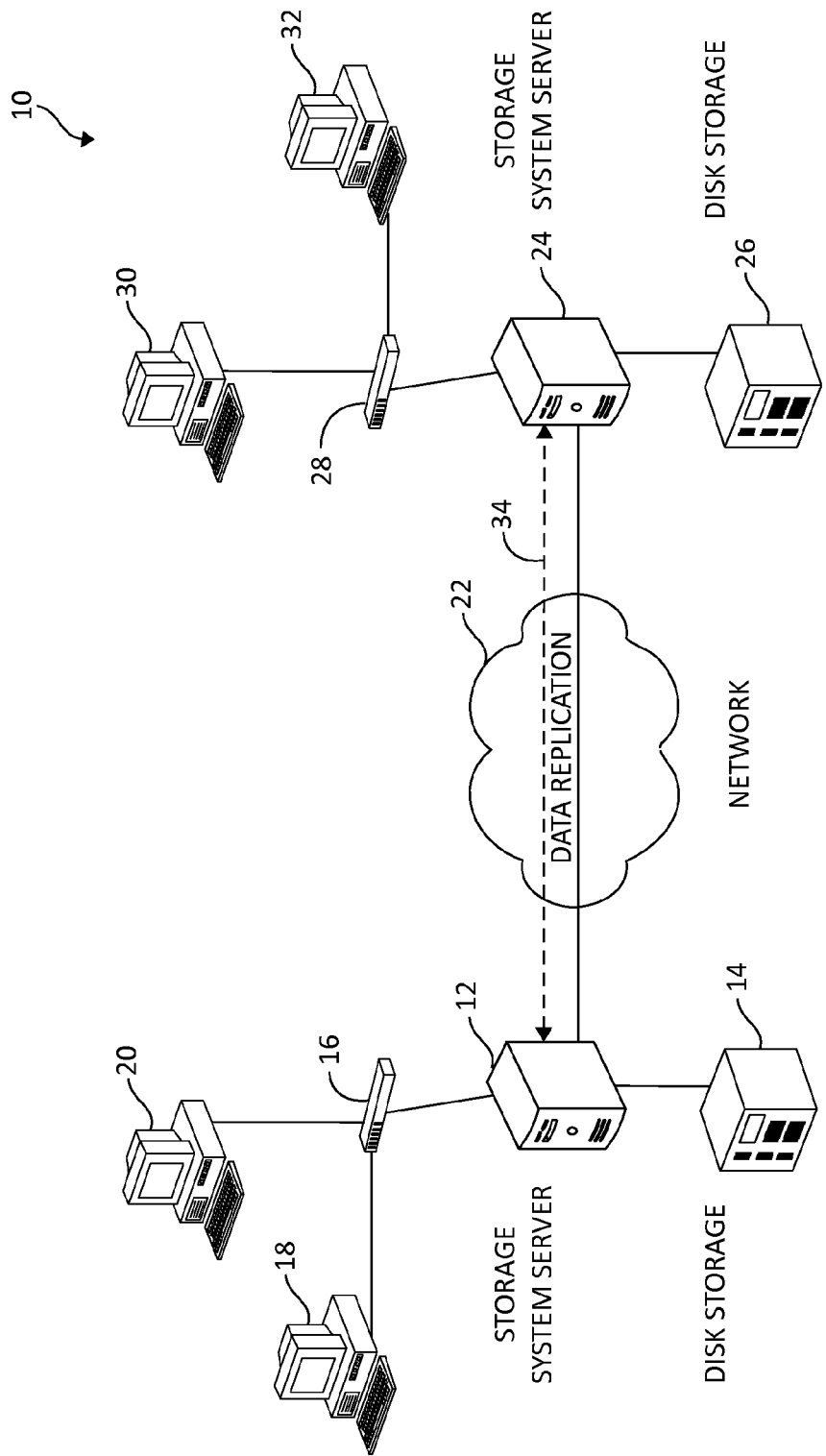
FIG. 1 illustrates an exemplary computing environment in which aspects of the present invention may be implemented.

Turning now to FIG. 1, exemplary architecture 10 of data storage systems (e.g., virtual tape systems) in a computing environment is depicted. Architecture 10 provides storage services to local hosts 18 and 20, and replicate data to remote data storage systems as shown. A local storage system server 12 in communication with a storage device 14 is connected to local hosts 18 and 20 over a network including components such as Fibre channel switch 16. Fibre channel switch 16 is capable, for example, of executing commands (such as small computer systems interface (SCSI) commands) for tape devices. The skilled artisan will appreciate that architecture 10 may include a variety of storage components. For example, storage devices 14 may include conventional hard disk drive (HDD) devices, or may include solid state drive (SSD) devices.

Local storage system server 12 is connected over network 22 to a remote storage system server 24. Remote server 24 communicates with a locally connected disk storage device 26, and with locally connected hosts 30 and 32 via another network and network component 28 such as Fibre channel switch 28. Network 22 may include a variety of network topologies, such as a wide area network (WAN), a local area network (LAN), a storage area network (SAN), and other configurations. Similarly, switches 16 and 28 may include other types of network devices.

Architecture 10, as previously described, provides local storage services to local hosts, and provides replicate data to the remote data storage systems (as denoted by data replication functionality using arrow 34). As will be described, various embodiments of the present invention and claimed subject matter may be implemented on architectures such as architecture 10. For example, in one embodiment, the disk storage device 14 may be part of a deduplicated storage system, storing deduplicated data entities. The deduplicated data entities may then undergo a data replication process 34 whereby the deduplicated data entities are replicated on the remote disk storage device 26. These processes will be further described in detail, following.

Such processes of replicating a data entity which resides in a deduplicated form within a deduplicated storage system, to a remote deduplication storage system, should be efficient in terms of processing time and storage requirements, both on the source and destination systems, and should possibly utilize the characteristics of the deduplication storage systems to facilitate such efficiencies.

Replication of multiple systems onto a single disaster recovery (DR) system is common for organizations with data storage requirements, such as those bound to certain data safe keeping laws, or those required to maintain data entity replicates with differing retention periods from many small to medium-sized sites, for example. As previously indicated, however, a potential problem may arise when a multiplicity of senders are configured in communication with a receiver. While one or two replication senders may be easily controlled, and the receiver can plan its capacity accordingly, many replication senders have a potential to cause turmoil in the receiver site when replication operations are performed simultaneously. This issue is enhanced when the receiver is also configured as a backup target.

Again, as previously mentioned, the question then arises as to which has higher priority, backup or incoming replication? This question as to prioritization is not generally addressed in conventional replication implementations. Accordingly, using any conventional solution carries the potential for race conditions on the available storage space. In this scenario, neither replication nor backup will have any kind of priority, and they would consume space according to the input/output (I/O) equal to the throughput each sender (including the backup host) is capable of producing.

Figure 2:
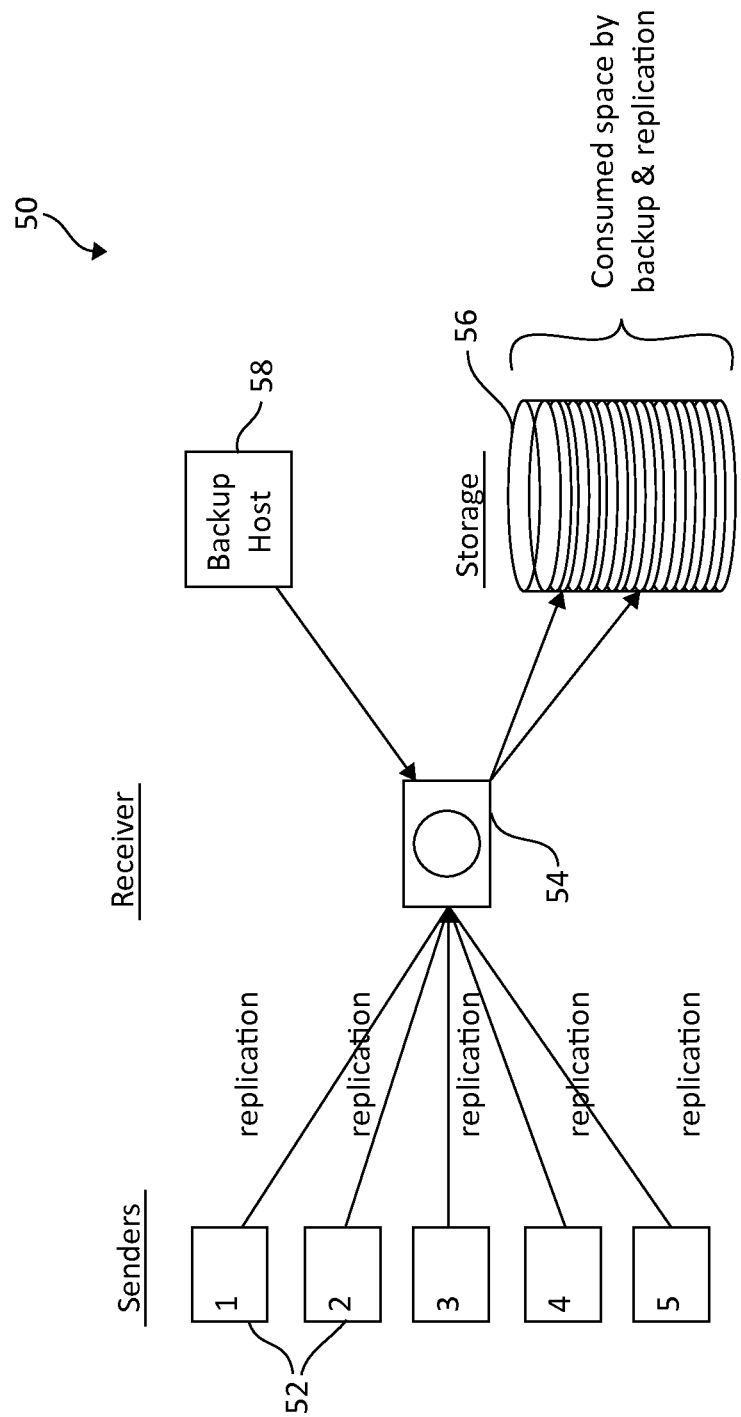
FIG. 2 illustrates an exemplary data replication and backup configuration.

Turning to FIG. 2, an exemplary many-to-one replication environment 50 is illustrated. Here, a multiplicity of senders 52 is in communication with a receiver 54 configured as a backup target from a backup host 58. The receiver 54 is also in communication with storage 56 (which, as the skilled artisan will appreciate, may include one or more storage devices in any number of implementations). As the receiver must provide backup functionality to the backup host 58, yet also facilitate the data replication through to storage 56, if no enforcement on storage capacity for storage 56 is performed, environment 50 fosters race conditions between replication and backup causing the storage 56 not to prefer any specific operation, backup or replication, such that once replication fills the storage 56 space in full, the backup operations facilitated by the receiver 54 for backup host 56 would not be able to execute, and would fail.

To address the scenario described above, the illustrated embodiments provide mechanisms for prioritizing backup over replication in deduplication systems, which dynamically enforces this capacity management issue while running replication and backup. Each system may have its own storage entities (e.g., cartridges) designated as having local ownership and replicated entities as having foreign ownership. Local entities created by the local system may be used for backup as well as replication to a remote site. Replicated entities at the remote site, having been created as a result of replication from replication sender systems, may be used for replication and for restoration operations.

A user, such as a system administrator, may be able to reserve nominal space for backup operations. In one exemplary embodiment, the user may reserve nominal space in terms of the backup host (e.g., 200 MB backup host data (nominal)/10 (deduplication ratio)=20 MB physical space). This operation may be performed online, and at any time after the system has been configured while it is running. The default behavior may be configured to be not reserving any space for backup.

As a result, both consumers (backup and replication) may use any available space in the storage. When a user defines reserved space (in nominal terms), the system may be adapted to present, based on the current used storage capacity, that the system is able to reserve up to a configured amount (e.g., X space) of space for backup operations. In one embodiment, each time the reserved space is about to be modified by the user, the system may present five nominal values. These may include, for example, (i) maximal capacity of the storage, (ii) replication used space, (iii) backup used space, (iv) free space in the storage, and (v) the current backup reservation.

Regardless of the status of the storage, the user can modify the value of the reservation to any value he chooses, even if at the moment the backup used space exceeds the value. If the new value is greater than the maximal storage capacity, the user may be notified, and/or the modification may not be permitted. In this manner, the mechanisms of the present invention promote the ability to provide prioritization of backup operations over replication activities, when both backup and replication operations are simultaneously performed.

In view of the foregoing, the following description provides exemplary mechanisms for enforcement of capacity management prioritization of backup over replication. As a preliminary matter, the system may be configured as part of the initial storage planning at the DR site, to prioritize backup operations over replication (since, for example, replication operations are part of and overall backup operation and as such, not as important). The user may provide such configuration. As a following step, the user may define a reservation space for backup to suit his backup needs. Once the configurations are complete and the system is in operation, the user may now monitor such configurations.

Turning now to FIG. 3, a number of exemplary terminology presently described and appearing in the following claimed subject matter is depicted in table form by term and description. First, "nominal data" is intended to refer to data as written by a backup host. The term "physical data" is intended to refer to data after deduplication and compression operations. The term "configured factoring ratio" is intended to refer to a user-defined system attribute for an expected nominal-to-physical data ratio as will be further described. The term "current factoring ratio" is intended to refer to an actual nominal-to-physical data ratio.

Continuing the depicted terminology, the term "calculated factoring ratio" is intended to refer to a calculation performed by the system that provides weights for the expected and the current nominal-to-physical data ratio dynamically based on capacity thresholds and used space. "Low capacity threshold" is intended to refer to a value, below which the calculated factoring ratio is defined to equal the configured factoring ratio. "High capacity threshold" is intended to refer to a value, above which the calculated factoring ratio equals the configured factoring ratio. "Used space" is intended to refer to an actual amount of space currently consumed physically in the storage by either backup or replication data. Finally, "used space of replicated cartridges" is intended to refer to an actual amount of space currently consumed by data entities (cartridges, in this case) originating in replication.

Figure 4:
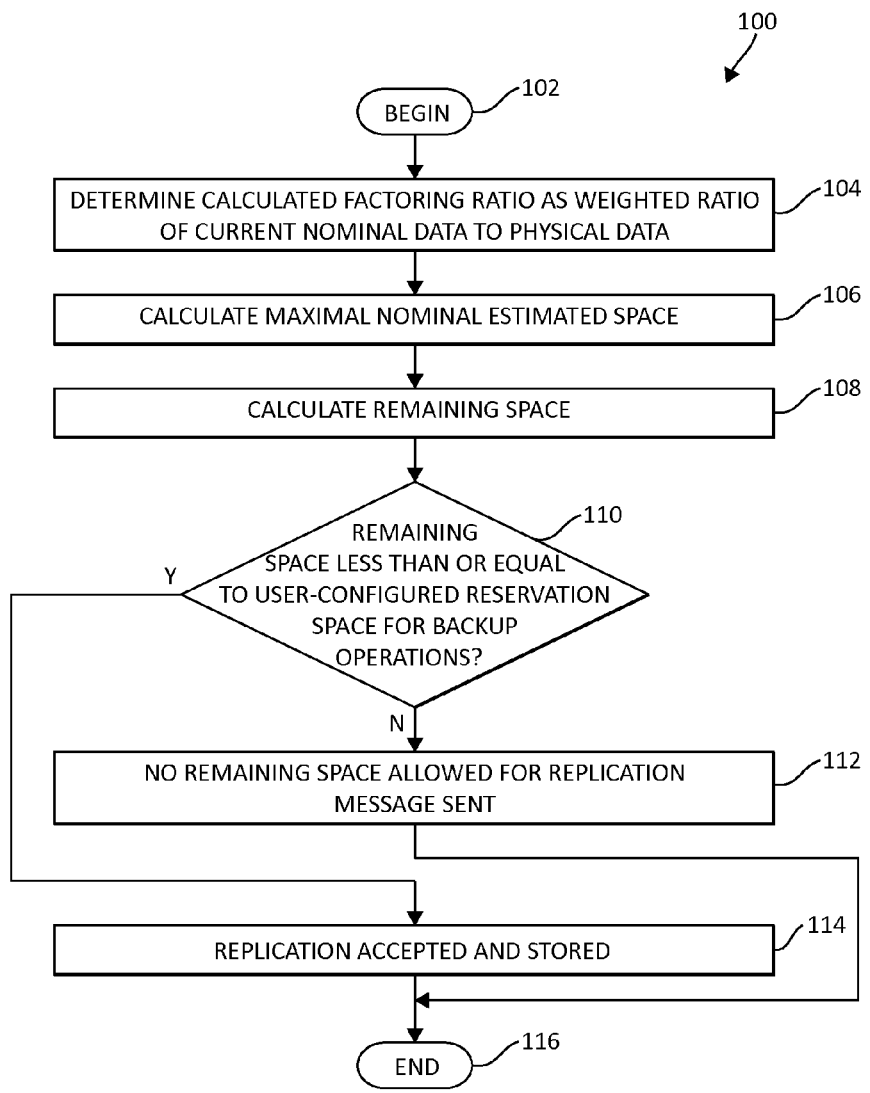
FIG. 4 illustrates an exemplary method for providing space reservation functionality in deduplication systems.
Figure 5:
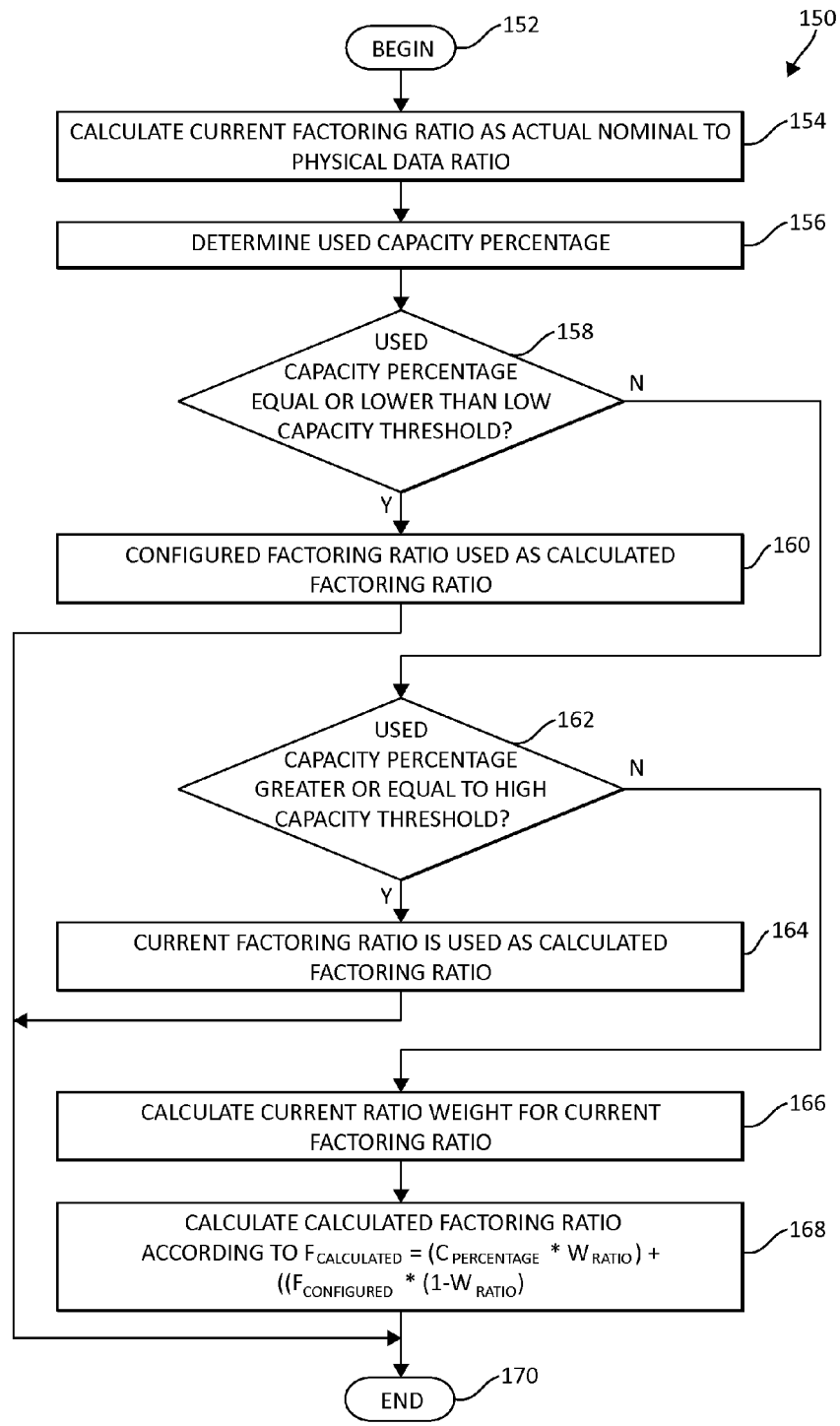
FIG. 5 illustrates an exemplary method for calculating a calculated factoring ratio pursuant to the exemplary method depicted in FIG. 4, previously.
Figure 6:
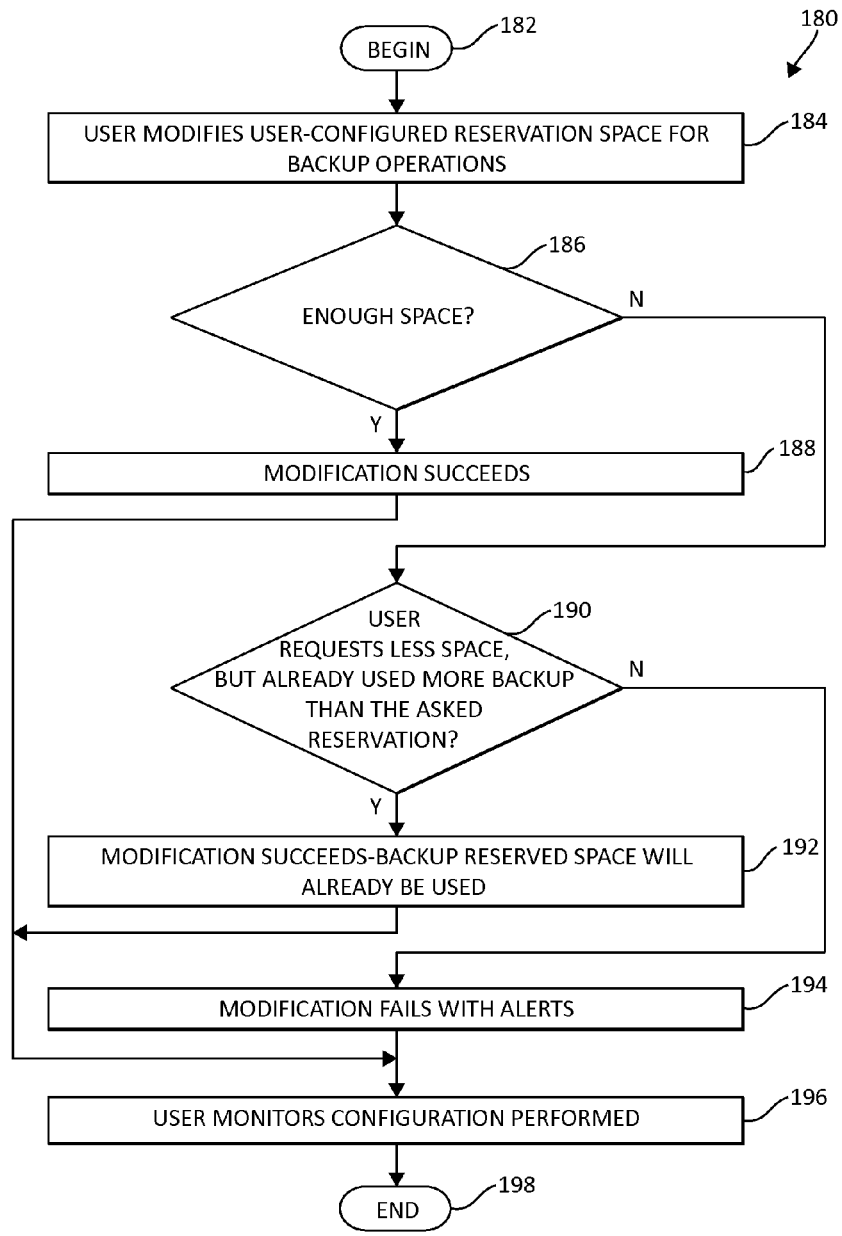
FIG. 6 illustrates an exemplary method for process flow of space reservation functionality according to the exemplary method depicted in FIG. 4, previously.
Figure 7:
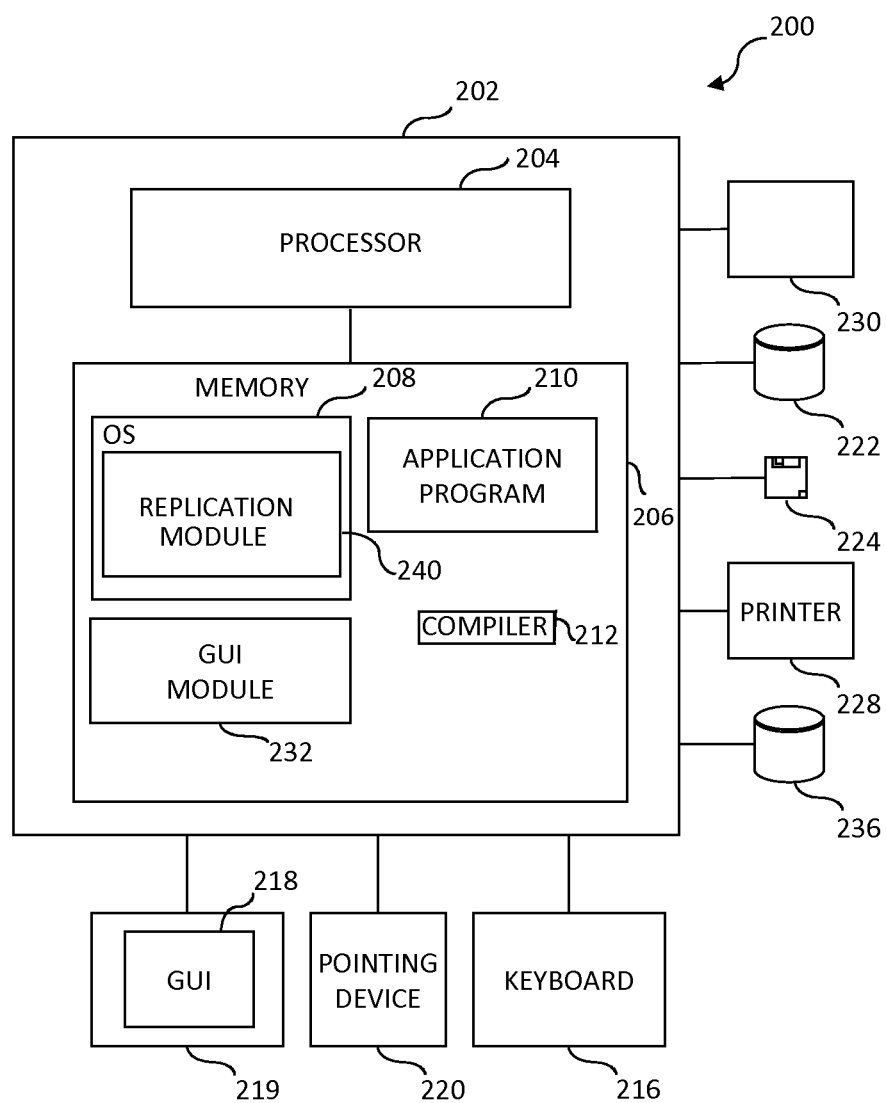
FIG. 7 illustrates an exemplary computing device including a processor device in a computing environment such as the computing environment shown in FIG. 1.

FIGS. 4, 5, and 6, following, illustrate exemplary functionality for providing space reservation in a deduplication system. FIG. 4 illustrates an exemplary overall process for space reservation, while FIG. 5, following, illustrates an exemplary method for calculating a calculated factoring ratio, and FIG. 6, following, illustrates a process flow for configuration and operation of the deduplication system incorporating the exemplary functionality previously depicted in FIGS. 4 and 5, previously.

Turning first to FIG. 4, method 100 begins (step 102) with the determination of a calculated factoring ratio as a weighted ratio of current nominal data to physical data (step 104). A maximal nominal estimated space is then calculated (step 106), and a remaining space, defined as the amount of storage space remaining after subtracting the replication-used nominal space from the maximal nominal estimated space calculated in step 106, is calculated (step 108).

If the remaining space is determined to be less than or equal to the space configured and reserved by the user for backup operations (step 110), then replication is accepted and stored (step 114). Conversely, if no remaining space is available, a message is sent to the user (step 112) and replication is denied. The method 100 then ends (step 116).

Turning next to FIG. 5, method 150 begins (step 152) by calculating a current factoring ratio as an actual nominal-to-physical data ratio (step 154). In one embodiment, the current factoring ratio may be defined as the used nominal data divided by the used space. As a next step, a used capacity percentage value is obtained (step 156). The used capacity percentage may be defined, in one embodiment, as the used space divided by the configured physical space, or the percentage of physical data in the storage out of the configured storage size.

In step 158, if the used capacity percentage is determined to be equal or less than the low capacity threshold, the configured (user-defined) factoring ratio is used as the calculated factoring ratio (step 160). If the used capacity percentage is greater or equal to the high capacity threshold (step 162), the current factoring ratio (again, actual-nominal-to-physical data ratio) is used as the calculated factoring ratio (step 164).

If the used capacity percentage is not equal or less than the low capacity threshold, or greater or equal to the high capacity threshold, a current ratio weight is calculated for the current factoring ratio. In one embodiment, this current ratio weight may be defined as the used capacity percentage minus the low capacity threshold, divided by (1–the low capacity threshold). This current ratio weight is then used to calculate the calculated factoring ratio in step 168, defined in one embodiment as $F_{calculated} = (C_{percentage} * W_{ratio}) + ((F_{configured} * (1 - W_{ratio}))$, where $F_{calculated}$ is the calculated factoring ratio, $C_{percentage}$ is the used capacity percentage, $W_{ratio}$ is the current ratio weight, and $F_{configured}$ is a configured factoring ratio defined as the user-configured system attribute for the expected nominal data to physical data ratio. The method 150 then ends (step 170).

Turning now to FIG. 6, method 180 begins (step 182) with the user attempting to modify the user-configured reservation space for backup operations (e.g, 20 TB of physical space) (step 184). If the system determines that enough space is available (step 186), then the modification succeeds (step 188). If however, this is not the case, but the user requests less space, and the system has already used more backup than the asked reservation space (step 190), the modification succeeds, but the backup reserved space will already be consumed (step 192). Alternatively to steps 186 and 190, if no space is available, the modification fails with one or more alerts raised to the user (step 194). The user then monitors the performed configuration (step 196). The method 180 then ends (step 198).

FIG. 6 hereafter provides an example of a portion of the computer environment 10 depicted in FIG. 1 in which the mechanisms of the foregoing embodiments may be implemented. It should be appreciated, however, that FIG. 6 is only exemplary and is not intended to state or imply any limitation as to the particular architectures in which the exemplary aspects of the various embodiments may be implemented. Many modifications to the architecture depicted in FIG. 6 may be made without departing from the scope and spirit of the following description and claimed subject matter.

FIG. 6 illustrates a portion 200 of an exemplary computer environment that can be used to implement embodiments of the present invention. A computer 202 comprises a processor 204 and a memory 206, such as random access memory (RAM). In one embodiment, storage system server 12 (FIG. 1) may include components similar to those shown in computer 202. The computer 202 is operatively coupled to a display 219, which presents images such as windows to the user on a graphical user interface 218. The computer 202 may be coupled to other devices, such as a keyboard 216, a mouse device 220, a printer 228, etc. Of course, those skilled in the art will recognize that any combination of the above components, or any number of different components, peripherals, and other devices, may be used with the computer 202.

Generally, the computer 202 operates under control of an operating system (OS) 208 (e.g. z/OS, OS/2, LINUX, UNIX, WINDOWS, MAC OS) stored in the memory 206, and interfaces with the user to accept inputs and commands and to present results, for example through a graphical user interface (GUI) module 232. In one embodiment of the present invention, the OS 208 facilitates the backup mechanisms. Although the GUI module 232 is depicted as a separate module, the instructions performing the GUI functions can be resident or distributed in the operating system 208, the application program 210, or implemented with special purpose memory and processors. OS 208 includes a replication module 240, which may be adapted for carrying out various processes and mechanisms (such as the aforementioned reservation of physical space for backup operations) in the exemplary embodiments previously described. Replication module 240 may be implemented in hardware, firmware, or a combination of hardware and firmware. In one embodiment, the replication module 240 may be embodied as an application specific integrated circuit (ASIC). As the skilled artisan will appreciate, functionality associated with the replication module 240 may also be embodied, along with the functionality associated with the processor 204, memory 206, and other components of computer 202, in a specialized ASIC known as a system on chip (SoC). Further, the functionality associated with the replication module (or again, other components of the computer 202) may be implemented as a field programmable gate array (FPGA).

As depicted in FIG. 6, the computer 202 includes a compiler 212 that allows an application program 210 written in a programming language such as COBOL, PL/1, C, C++, JAVA, ADA, BASIC, VISUAL BASIC or any other programming language to be translated into code that is readable by the processor 204. After completion, the computer program 210 accesses and manipulates data stored in the memory 206 of the computer 202 using the relationships and logic that was generated using the compiler 212. The computer 202 also optionally comprises an external data communication device 230 such as a modem, satellite link, Ethernet card, wireless link or other device for communicating with other computers, e.g. via the Internet or other network.

Data storage device 222 is a direct access storage device (DASD) 222, including one or more primary volumes holding a number of datasets. DASD 222 may include a number of storage media, such as hard disk drives (HDDs), tapes, and the like. Data storage device 236 may also include a number of storage media in similar fashion to device 222. The device 236 may be designated as a backup device 236 for holding backup versions of the number of datasets primarily stored on the device 222. As the skilled artisan will appreciate, devices 222 and 236 need not be located on the same machine. Devices 222 may be located in geographically different regions, and connected by a network link such as Ethernet. Devices 222 and 236 may include one or more volumes, with a corresponding volume table of contents (VTOC) for each volume.

In one embodiment, instructions implementing the operating system 208, the computer program 210, and the compiler 212 are tangibly embodied in a computer-readable medium, e.g., data storage device 220, which may include one or more fixed or removable data storage devices 224, such as a zip drive, floppy disk, hard drive, DVD/CD-ROM, digital tape, flash memory card, solid state drive, etc., which are generically represented as the storage device 224. Further, the operating system 208 and the computer program 210 comprise instructions which, when read and executed by the computer 202, cause the computer 202 to perform the steps necessary to implement and/or use the present invention. For example, the computer program 210 may comprise instructions for implementing the grid set manager, grid manager and repository manager previously described. Computer program 210 and/or operating system 208 instructions may also be tangibly embodied in the memory 206 and/or transmitted through or accessed by the data communication device 230. As such, the terms "article of manufacture," "program storage device" and "computer program product" as may be used herein are intended to encompass a computer program accessible and/or operable from any computer readable device or media.

Embodiments of the present invention may include one or more associated software application programs 210 that include, for example, functions for managing a distributed computer system comprising a network of computing devices, such as a storage area network (SAN). Accordingly, processor 204 may comprise a storage management processor (SMP). The program 210 may operate within a single computer 202 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those skilled in the art. (Note that a fibre channel SAN is typically used only for computers to communicate with storage systems, and not with each other.)

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A computer-implemented method for space reservation in a deduplication system by a processor, comprising:
    determining a calculated factoring ratio as a weighted ratio of current nominal data to physical data based on at least one storage capacity threshold and a used storage space currently physically consumed by one of backup and replication data;
    calculating a maximal nominal estimated space in the computing storage environment;
    calculating a remaining space; and
    accepting and storing data replication operations in the computing storage environment if the remaining space is below a predetermined threshold of space for backup operations.

2. The computer-implemented method of claim 1, further including, defining the remaining space as the maximal nominal estimated space minus a current nominal space in the computing storage environment.

3. The computer-implemented method of claim 1, wherein determining the calculated factoring ratio further includes determining a current factoring ratio as an actual nominal to physical data ratio.

4. The computer-implemented method of claim 3, wherein determining the calculated factoring ratio further includes determining a used capacity percentage defined as the used storage space divided by a configured storage size of the computing storage environment.

5. The computer-implemented method of claim 4, wherein if the used capacity percentage is one of lower and equal to a low storage capacity threshold, the configured factoring ratio is used as the calculated factoring ratio.

6. The computer-implemented method of claim 5, wherein if the used capacity percentage is one of greater and equal to a high storage capacity threshold, the current factoring ratio is used as the calculated factoring ratio.

7. The computer-implemented method of claim 6, wherein if the used capacity percentage is not one of lower and equal to the low storage capacity threshold, and is not one of greater and equal to the high storage capacity threshold, a current ratio weight for the current factoring ratio is calculated.

8. The computer-implemented method of claim 7, wherein determining the calculated factoring ratio is performed according to:

$$F_{calculated} = (C_{percentage} * W_{ratio}) + ((F_{configured} * (1 - W_{ratio})),$$

where $F_{calculated}$ is the calculated factoring ratio, $C_{percentage}$ is the used capacity percentage, $W_{ratio}$ is the current ratio weight, and $F_{configured}$ is a configured factoring ratio defined as a user-configured system attribute for an expected nominal data to physical data ratio.

9. The computer-implemented method of claim 8, wherein calculating the maximal nominal estimated space is performed by multiplying a maximal physical space by the calculated factoring ratio.

10. A computer-implemented method for space reservation in a deduplication system by a processor, comprising:
    determining a calculated factoring ratio as a weighted ratio of current nominal data to physical data based on at least one storage capacity threshold and a used storage space currently physically consumed by one of backup and replication data;
    calculating a maximal nominal estimated space in the computing storage environment;
    calculating a remaining space; and
    accepting and storing data replication operations in the computing storage environment if the remaining space is one of equal and less than a user-configured reservation space for backup operations.

11. The computer-implemented method of claim 10, further including, defining the remaining space as the maximal nominal estimated space minus a current nominal space in the computing storage environment.

12. The computer-implemented method of claim 10, wherein determining the calculated factoring ratio further includes determining a current factoring ratio as an actual nominal to physical data ratio.

13. The computer-implemented method of claim 12, wherein determining the calculated factoring ratio further includes determining a used capacity percentage defined as the used storage space divided by a configured storage size of the computing storage environment.

14. The computer-implemented method of claim 13, wherein if the used capacity percentage is one of lower and equal to a low storage capacity threshold, the configured factoring ratio is used as the calculated factoring ratio.

15. The computer-implemented method of claim 14, wherein if the used capacity percentage is one of greater and equal to a high storage capacity threshold, the current factoring ratio is used as the calculated factoring ratio.

16. The computer-implemented method of claim 15, wherein if the used capacity percentage is not one of lower and equal to the low storage capacity threshold, and is not one of greater and equal to the high storage capacity threshold, a current ratio weight for the current factoring ratio is calculated.

17. The computer-implemented method of claim 16, wherein determining the calculated factoring ratio is performed according to:

$$F_{calculated} = (C_{percentage} * W_{ratio}) + ((F_{configured} * (1 - W_{ratio})),$$

where $F_{calculated}$ is the calculated factoring ratio, $C_{percentage}$ is the used capacity percentage, $W_{ratio}$ is the current ratio weight, and $F_{configured}$ is a configured factoring ratio defined as a user-configured system attribute for an expected nominal data to physical data ratio.

18. The computer-implemented method of claim 17, wherein calculating the maximal nominal estimated space is performed by multiplying a maximal physical space by the calculated factoring ratio.

* * * * *